(12) United States Patent
Dale et al.

(10) Patent No.: US 7,515,566 B2
(45) Date of Patent: Apr. 7, 2009

(54) PARTIAL MESH COMMUNICATION IN HUB BASED SYSTEM

(75) Inventors: Mark Dale, Hudson, OH (US); Richard Gedney, Avon, OH (US)

(73) Assignee: ViaSat, Inc., Carlsbad, CA (US)

( * ) Notice: Subject to any disclaimer, the term of this patent is extended or adjusted under 35 U.S.C. 154(b) by 414 days.

(21) Appl. No.: 11/154,928

(22) Filed: Jun. 16, 2005

(65) Prior Publication Data
US 2006/0126576 A1 Jun. 15, 2006

Related U.S. Application Data

(60) Provisional application No. 60/634,817, filed on Dec. 9, 2004.

(51) Int. Cl.
*H04J 3/16* (2006.01)
*H04J 3/24* (2006.01)

(52) U.S. Cl. .......... 370/336; 370/321; 370/337; 370/442; 455/427; 455/428; 455/430; 455/12.1

(58) Field of Classification Search .......... 370/316, 370/336, 346, 321, 323, 325, 322, 330, 337, 370/442; 455/12.1, 13.1, 13.2, 13.3, 427, 455/428, 430, 7; 725/66, 64, 65
See application file for complete search history.

(56) References Cited

U.S. PATENT DOCUMENTS

| | | | | |
|---|---|---|---|---|
| 5,450,395 A * | 9/1995 | Hostetter et al. | ........... | 370/320 |
| 5,959,999 A * | 9/1999 | An | ........... | 370/442 |
| 6,052,364 A * | 4/2000 | Chalmers et al. | ........... | 370/312 |
| 6,487,183 B1 * | 11/2002 | Lo et al. | ........... | 370/326 |
| 6,570,859 B1 * | 5/2003 | Cable et al. | ........... | 370/323 |
| 6,574,794 B1 | 6/2003 | Sarraf | | |
| 6,839,332 B1 * | 1/2005 | Agarwal et al. | ........... | 370/321 |
| 6,894,990 B1 * | 5/2005 | Agarwal et al. | ........... | 370/321 |
| 6,975,647 B2 * | 12/2005 | Neale et al. | ........... | 370/466 |
| 7,054,391 B2 * | 5/2006 | Thesling | ........... | 375/340 |
| 7,200,185 B2 * | 4/2007 | Thesling et al. | ........... | 375/316 |
| 7,215,650 B1 * | 5/2007 | Miller et al. | ........... | 370/315 |
| 7,251,224 B2 * | 7/2007 | Ades et al. | ........... | 370/330 |
| 2002/0006118 A1 * | 1/2002 | Rodriguez et al. | ........... | 370/323 |
| 2004/0136334 A1 * | 7/2004 | Heiman et al. | ........... | 370/316 |
| 2004/0172657 A1 | 9/2004 | Phillips et al. | | |
| 2004/0234018 A1 * | 11/2004 | Ram et al. | ........... | 375/354 |
| 2005/0037764 A1 * | 2/2005 | Trachtman | ........... | 455/450 |
| 2005/0055729 A1 | 3/2005 | Atad et al. | | |
| 2005/0058229 A1 * | 3/2005 | Alagha | ........... | 375/346 |
| 2005/0125798 A1 | 6/2005 | Peterson | | |
| 2006/0050660 A1 * | 3/2006 | Wells | ........... | 370/316 |

OTHER PUBLICATIONS

European Telecommunications Standards Institute 2000, "Digital Video Broadcasting (DVB); Interaction Channel for Satellite Distribution Systems" ETSI EN 301 790 V1.2.2 (Dec. 2000), pp. 1-99.

(Continued)

*Primary Examiner*—George Eng
*Assistant Examiner*—Brandon J Miller
(74) *Attorney, Agent, or Firm*—Townsend and Townsend and Crew LLP

(57) ABSTRACT

A partial mesh link channel is established within a satellite communication system by allocating return link channel resources to the partial mesh link channel.

20 Claims, 4 Drawing Sheets

OTHER PUBLICATIONS

European Telecommunications Standards Institute 2003, "Digital Video Broadcasting (DVB); Interaction Channel for Satellite Distribution Systems" ETSI EN 301 790 V1.3.1 (Mar. 2003), pp. 1-110.

European Telecommunications Standards Institute 1997, "Digital Video Broadcasting (DVB); Framing Structure, Channel Coding and Modulation for 11/12 GHz Satellite Services" EN 300 421 V1.1.2 (Aug. 1997), pp. 1-24.

European Telecommunications Standards Institute 2004, "Digital Video Broadcasting (DVB); Second Generation Framing Structure, Channel Coding . . . Services, News Gathering and Other Broadband Satellite Applications" Draft ETSI EN 302 307 V1.1.1 (Jun. 2004), pp. 1-74.

* cited by examiner

PARTIAL MESH COMMUNICATION IN HUB BASED SYSTEM

This application claims the benefit of U.S. Provisional Application Ser. No. 60/634,817, filed on Dec. 9, 2004, the entire disclosure of which is incorporated herein by reference.

This application generally relates to satellite communication systems, and particularly relates to Digital Video Broadcast Return Channel via Satellite (DVB-RCS) communication systems.

European Telecommunication Standards Institute (ETSI) document EN 301 790 is a standard for interactive communication by satellite. This standard is often referred to as the DVB-RCS standard. The DVB-RCS standard defines a hub-spoke communication architecture through which network users communicate via a user terminal to a central hub. In a hub-spoke system, all communications to an external network, or to other user terminals, are processed through the central hub. There are no direct communications between user terminals.

A mesh communication architecture is an alternative satellite communication architecture. In a mesh architecture, a user terminal may communicate directly with any other user terminal without a central hub. Typically one user terminal serves as the "reference terminal" which provides bandwidth provisioning and other communication and channel resource control.

Hub-spoke architectures are well suited to applications where remote user terminals need connectivity to a central network, such as providing Internet access to remote users. However, hub-spoke architectures are sub-optimal in the cases where one user terminal needs to communicate directly with another user terminal, as the requirement of each user terminal to go through the central hub doubles the required satellite bandwidth and the latency due to Earth-satellite propagation time. Accordingly, mesh architectures are better suited for terminal-to-terminal communications.

Disclosed herein are a system and method to extend hub-spoke architectures into systems and methods that also support mesh architectures. One example hub-spoke architecture is the DVB-RCS standard architecture. The systems and methods disclosed herein facilitate remote terminal operation according to a standards-based RCS hub-spoke network with simultaneous mesh communication operations.

DRAWINGS

DETAILED DESCRIPTION

Figure 1:
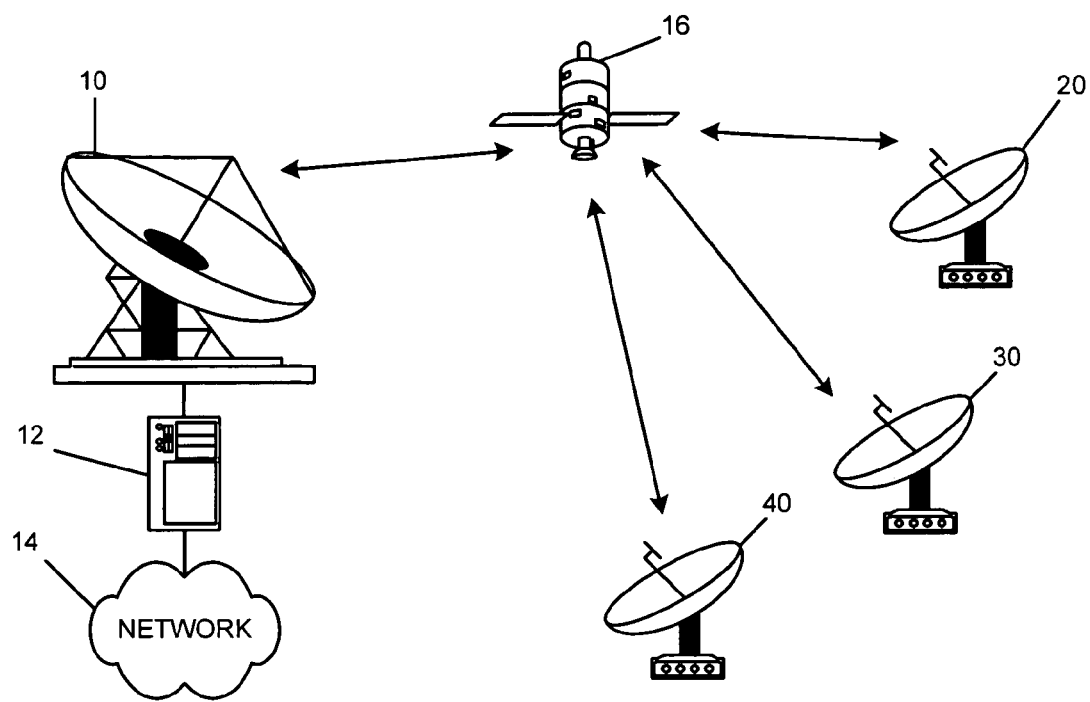
FIG. 1 is a block diagram of a prior art hub-spoke architecture satellite communication system.

FIG. 1 is a block diagram of a prior art hub-spoke architecture satellite communication system. The system of FIG. 1 includes an uplink antenna 10 connected to a satellite hub station 12. The hub station 12 may comprise a network controller or other system control device hardware and software operable to monitor and/or control data communication parameters. The satellite hub station 12 in turn is connected to a network 14, such as the Internet or other data provider network. The hub station 12 communicates via a satellite 16 with a plurality of remote terminals 20, 30 and 40. Each remote terminal 20, 30 and 40 typically comprises a dish antenna and satellite modem.

The hub station 12 may generate a forward link time division multiplexed (TDM) signal that is received by the remote terminals 20, 30 and 40. The forward link signal may conform to current satellite communication standards, such as those defined by European Telecommunication Standards Institute documents ETSI EN 302 307, ETSI EN 301 790, or EN 300 421, the disclosures of which are incorporated herein by reference. All terminals 20, 30 and 40 may communicate back to the hub station 12 using one or more burst multi-frequency, time division multiple access (MF-TDMA) return link channels, such as those defined by European Telecommunication Standards Institute documents ETSI EN 301 790. All communications between each of the remote terminals 20, 30 and 40 and between each of the remote terminals 20, 30 and 40 and the network 14 are processed through the hub station 12. The hub station 12 provides bandwidth provisioning, defines frequency and timing requirements for communication channels, and manages other channel resources.

Figure 2:
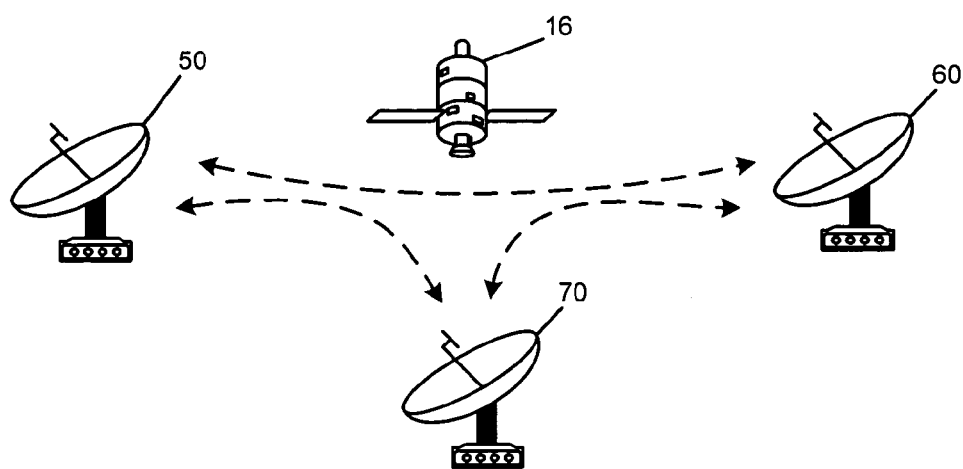
FIG. 2 is a block diagram of a prior art mesh architecture satellite communication system.

FIG. 2 is a block diagram of a prior art mesh architecture satellite communication system. In the network of FIG. 2, the remote terminals 50, 60 and 70 may communicate directly with each other. One of the terminals typically serves as a reference terminal that provides bandwidth provisioning and other communication control. For example, terminal 70 may control channel resources for all communications between the terminals 50, 60 and 70. These resources may include bandwidth provisioning, frequency and timing requirements for a communication channel, and other channel resources.

Figure 3:
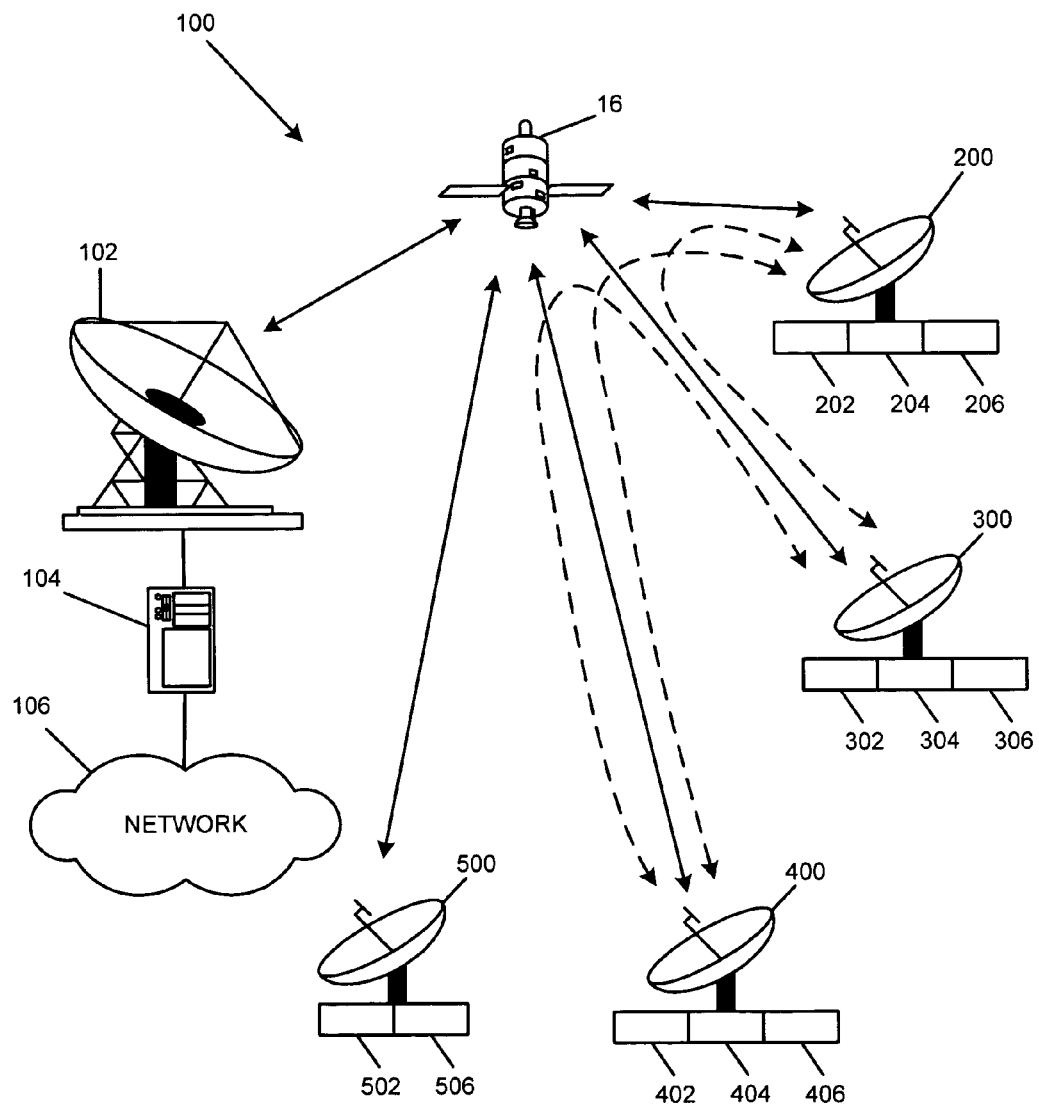
FIG. 3 is a block diagram of a partial mesh architecture in a hub-spoke architecture satellite communication system.

FIG. 3 is a block diagram of a partial mesh architecture in a hub-spoke architecture satellite communication system 100. The system of FIG. 3 includes an uplink antenna 102 connected to a satellite hub station 104. The hub station 104 may comprise a network controller or other system control device hardware and software operable to monitor and/or control data communication parameters. The satellite hub station 104 in turn is connected to a network 106, such as the Internet or other data provider network. The hub station 102 includes a satellite transceiver subsystem configured to transmit and receive digital communication data via a satellite 16 with a plurality of remote terminals 200, 300, 400 and 500.

The hub station 102 may generate a forward link TDM signal that is received by the remote terminals 200, 300, 400 and 500. The forward link signal may conform to current satellite communication standards. Each of the remote terminals 200, 300, 400 and 500 may communicate back to the hub station 102 using one or more burst MF-TDMA return link channels. The forward and return links are illustrated by the solid bi-directional arrows.

Additionally, the remote terminals 200, 300 and 400 may communicate directly to other terminals over a partial mesh communication architecture. The partial mesh links are illustrated by the dashed bi-directional arrows. Each remote terminal 200, 300 and 400 respectively includes forward link receivers 202, 302 and 402; partial mesh link receivers 204, 304 and 404; and transmitter subsystems 206, 306 and 406.

The remote terminal 500, which includes only a forward link receiver 502 and a transmitter subsystem 506, is not part of the partial mesh architecture. The remote terminal 500 may comprise, for example, a prior art hub-spoke terminal in a legacy system.

Each forward link receiver 202, 302, 402 and 502 is configured to receive digital communication data transmitted from the hub station over the forward link channel, and each partial mesh link receiver 204, 304 and 504 is configured to receive burst transmissions transmitted from other user terminals over a partial mesh link channel. The transmitter subsystems 206, 306 and 406 are configured to burst transmit digital communication data to the hub station 104 over the return link or to another remote terminal over the partial mesh link. The transmitter subsystem 506 is configured to burst transmit digital communication data to the hub station 104 over the return link.

The system 100 of FIG. 3 utilizes the existing RCS capability of a hub-spoke architecture to facilitate the partial mesh architecture. The hub station 104 defines the MF-TDMA channel of the return link channel and designates resources of the return link channel to support a partial mesh link channel. For example, the hub station 104 may provide return link synchronization data to each of the remote terminals 200, 300, 400 and 500 that governs synchronization, timing and frequency parameters for the return link channel. Each of the remote terminals 200, 300, 400 and 500 may be allotted time slots during which the remote units may transmit data back to the hub station 104.

The synchronization data may also include partial mesh control data that allots particular time slots to define the partial mesh link channel. During the time slots allotted to the partial mesh link channel, the terminals 200, 300 and 400 may communicate directly with one another. For example, each terminal 200, 300 and 400 may be allotted one time slot during which it may transmit data over the partial mesh link channel and two time slots during which it may listen for broadcast or unicast data.

Figure 4:
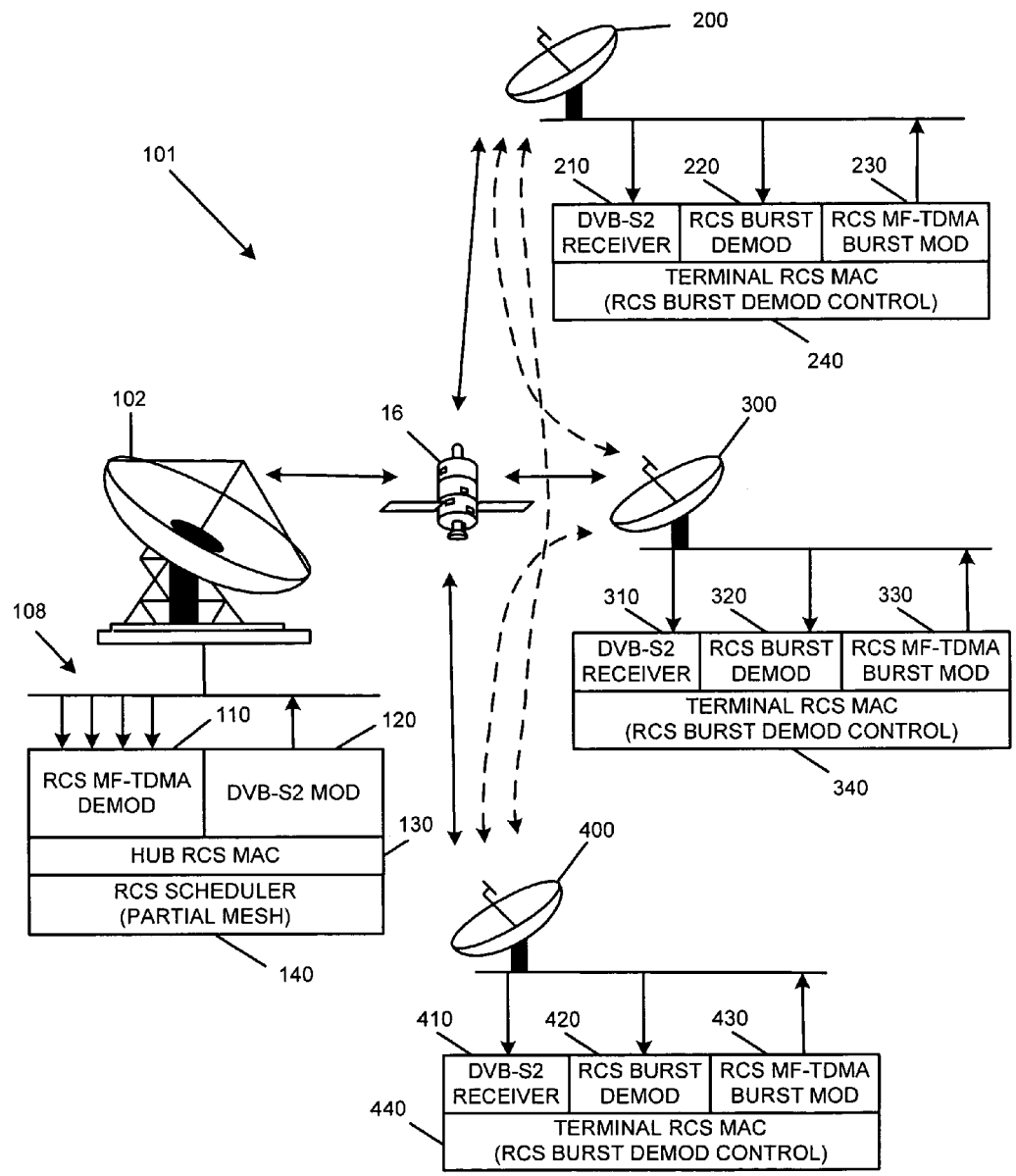
FIG. 4 is a block diagram of a partial mesh architecture in a DVB-RCS satellite communication system.

The designation of resources of the return link to support the partial mesh link facilitates implementation of the partial mesh architecture into existing hub-spoke systems. Remote terminals may either be configured in mesh or hub-spoke mode simultaneously within the same network. For example, FIG. 4 is a block diagram of a partial mesh architecture in a DVB-RCS satellite communication system 101. The RCS partial mesh network of FIG. 4 can simultaneously support both standard RCS terminals and terminals with partial mesh capability.

A hub station 108 includes an RCS MF-TDMA demodulator 110 that is configured to receive and demodulate digital communication data transmitted over the return link, and a DVB-S2 modulator 120 that is configured to transmit TDM digital communication data to each of the remote terminals 200, 300 and 400 in accordance with ETSI EN 301 790. A HUB RCS Media Access Control (MAC) device 130 provides basic MAC functionality to implement the MAC layer as defined by ETSI EN 301 790. These functions may include return channel satellite terminal (RCST) synchronization, burst format, coding, modulation, and the like.

The hub station 108 also includes an RCS scheduler 140 that is configured to designate return link channel resources to facilitate a partial mesh link channel. The RCS scheduler 140 may, for example, allocate bandwidth from the return link by designating particular MF-TDMA time slots for the return link to two or more remote terminals to create a partial mesh link channel. Each remote terminal communicating over the partial mesh link may further be allocated a portion of the designated partial mesh link channel time slots to communicate data to or receive data from other remote terminals.

Each remote terminal 200, 300 and 400 respectively includes a DVB-S2 receiver 210, 310 and 410; an RCS burst demodulator 220, 320 and 420; an RCS MF-TDMA burst modulator 230, 330 and 430; and a terminal RCS MAC device 240, 340 and 440. The DVB-S2 receivers 210, 310 and 410 are configured to receive TDM digital communication data transmitted from the hub station 108. The RCS MF-TDMA burst modulators 230, 330 and 430 are configured to transmit digital communication data to the hub station 108 over the return link or, alternatively, transmit digital communication data to one or more remote terminals over the partial mesh link. The RCS burst demodulators 220, 320 and 420 are configured to listen at least during time slots allotted to the partial mesh link for multicast or unicast digital communication data transmitted over the partial mesh link.

The terminal RCS MAC devices 240, 340 and 440 provides basic MAC functionality to implement the MAC layer. These functions may include return channel satellite terminal (RCST) synchronization, burst format, coding, modulation, and the like. Additionally, the terminal RCS MACs provide RCS burst demodulator control.

The MAC layer may be extended from the current ETSI EN 301 790 standard for better facilitation of the partial mesh architecture. For example, bandwidth scheduling algorithms of the RCS scheduler 140 may be incorporated into the MAC layer. Forward link signaling table fields may be modified or additional tables specific to the partial mesh link may be added to support the partial mesh architecture.

Signaling from the remote terminals to the hub station may utilize existing return link protocols, extend current return link protocols, or add additional return link protocols. Signaling may also include source and destination information in order to resolve ambiguity in the partial mesh network. Existing return link protocols may be used or interpreted to provide the required source and destination data, or satellite access control (SAC) data or other data may be modified or extended to provide the source and destination information.

Burst addressing, such as unicast and multicast burst addressing, may include source and destination information. The burst addressing may be implemented using existing return link data fields, or by adding new fields as an extension to the current return link protocols.

Figure 5:
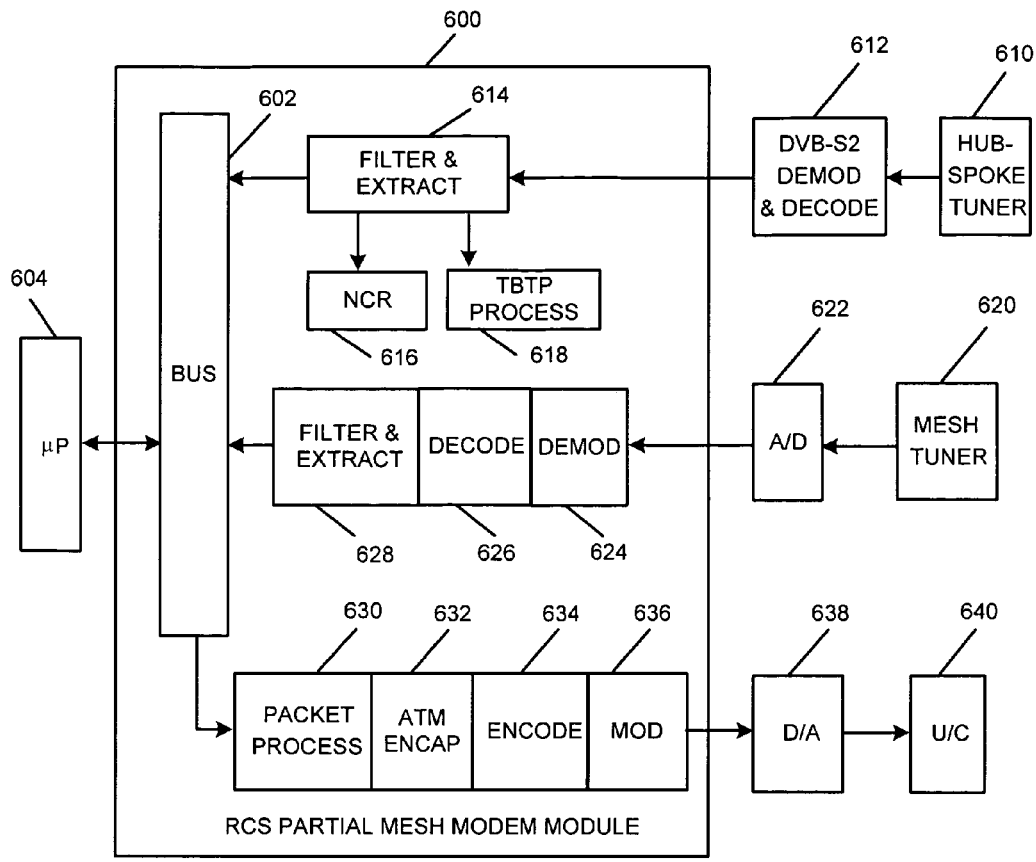
FIG. 5 is a block diagram of a RCS partial mesh modem module in a remote terminal.

FIG. 5 is a block diagram of an RCS partial mesh modem module 600 in a remote terminal. The DVB-S2 receiver is realized by a hub-spoke tuner 610 and a DVB-S2 demodulator and decoder 612. A filter and extractor processor 614 recovers the transmitted data signal. The network clock reference (NCR) processor receives a stream of NCR packets from the hub station 108 to regenerate remote terminal's internal clock and aid in network synchronization. The Terminal Burst Timing Plan (TBTP) processor 618 processes TBTP data that allows the remote terminal to communicate at specific time intervals using specific assigned carrier frequencies at an assigned transmit power.

The RCS burst demodulator is realized by a mesh tuner 620 and an analog-to-digital converter 622. The mesh tuner 624 is configured to receive burst transmissions transmitted from other remote terminals over the partial mesh link. A demodulator 624 demodulates the digital signal output by the analog-to-digital converter 622. A decoder 626 and a filter and extractor processor 628 decode and recover the transmitted data signal.

The RCS MF-TDMA burst modulator is realized by a digital-to-analog converter 638 and a block up converter 640. Digital communication data provided to the digital-to-analog converter 638 is generated by a packet processor 630 and an asynchronous transfer mode encapsulation processor 632.

Encapsulation of IP packets may be accomplished via AAL5 using ATM cells, or by other encapsulation methods.

An encoder 634 and a modulator 636 encodes and modulates the ATM encapsulated data output by the ATM encapsulation processor 632. The Circular Recursive Systematic Convolution (CRSC) Turbo code and Reed Solomon-Convolutional coding defined in EN 301 790 may be used for encoding bursts both for terminal-to-hub and terminal-to-terminal transmissions. Other coding techniques may also be used. Quadrature phase shift keying (QPSK) modulation may be used to modulate the ATM encapsulated data, as well as other modulation techniques.

Data output from the filter and extractor processors 614 and 628 are provided to a microprocessor 604 via a data bus 602 for further data processing as necessary. Likewise, data to be transmitted over either the return link or the partial mesh link are provided to the RCS MF-TDMA burst modulator via the data bus 602.

The partial mesh terminals disclosed herein may simultaneously share return channels with other partial mesh terminals as well as remote terminals that are only hub-spoke capable. The hub station 108 controls return link channel configuration, control, and resource management as defined for RCS networks by ETSI EN 301 790.

Extensions for the partial mesh link related to configuration, bandwidth allocation, timing synchronization, RF power and frequency offset control may be accommodated within the existing RCS framework. Such partial mesh link control data may be provided over the existing forward link. In the example DVB-S2 partial mesh network system described herein, synchronization is accomplished by the remote terminals communicating with the hub station to obtain network synchronization data and to maintain timing synchronization. This timing and synchronization data applies to both terminal-to-hub communications over the return link and terminal-to-terminal communications over the partial mesh link.

Burst formats for burst communications transmitted over the partial mesh link and received by other remote terminals are of the burst transmission type as defined in ETSI EN 301 790. The MF-TDMA frame, super-frame and timeslot structure are also as defined in ETSI EN 301 790.

Adaptive coding and modulation may also be supported in the partial mesh networks by defining a range of channels with desired symbol rates, modulation type and code rates (MODCODEs). The hub station 108 assigns channels with MODCODEs and symbol rates to remote terminals that are appropriate for link conditions being experienced by the remote terminals.

Remote terminals may report partial mesh signal quality data, such as received SNR, to the hub station 108 on a per-connection basis. For example, the remote terminals may report the SNR for packets received from the hub station 108 and the SNR for packets received on the partial mesh link to the hub station 108 via the forward link. This signal quality data is used by the hub station 108 to determine appropriate MODCODE and channel assignments.

Uplink power and transmit frequency between the remote terminals 108 in the partial mesh network may also be controlled. For terminal-to-terminal mesh connections, the remote terminals report received power levels and frequency offsets to the hub station 108 via common signal channel (CSC) messages, synchronization burst type message, or other messages over the return link. The hub station 108 controls the power levels, frequency offsets, and other partial mesh link resources via correction messages embedded in the correction message table (CMT). Corrections may be provided on a per-connection basis. Alternatively, a master remote terminal may control partial mesh link resources by communicating partial mesh control data to other remote terminals by either unicast or multicast transmissions, or by providing the partial mesh control data to the hub station 108 for subsequent multicast transmission by the hub station 108.

Figure 6:
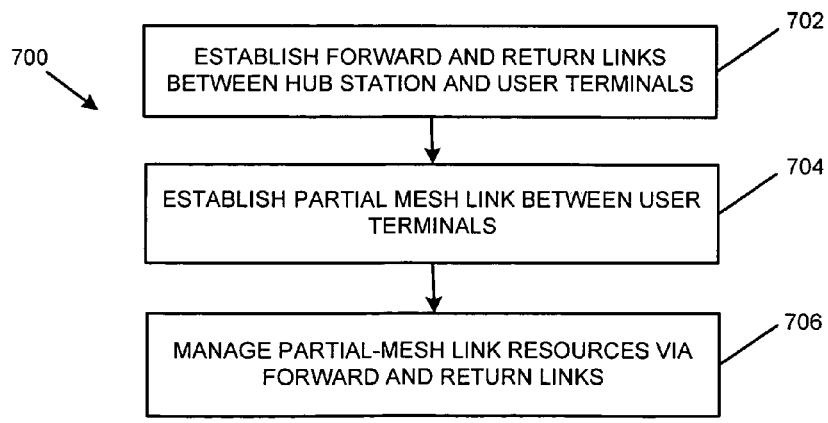
FIG. 6 is a flow diagram of a process of communicating digital data via satellite between a hub station and a plurality of user terminals.

FIG. 6 is a flow diagram 700 of a process of communicating digital data via satellite between a hub station and a plurality of user terminals. In step 702, forward and return links between a hub station and a plurality of user terminals is established. The forward and return links may be established in accordance with current satellite communication standards.

In step 704, a partial mesh link is established between remote terminals. The partial mesh link may be established by an RCS scheduler in the hub station in response to receiving a request from a remote terminal to communicate with one or more other remote terminals.

In step 706, the partial mesh resources are managed via the forward and return links. For example, a remote terminal in the partial mesh network may communicate partial mesh link control data to the hub station for subsequent multicast to all remote terminals. Alternatively, the hub station may determine the appropriate partial mesh control data in response to partial mesh link quality data received from one or more remote terminals and subsequently broadcast the partial mesh control data to the remote terminals. As a further alternative, a master remote terminal may manage partial mesh link resources by communicating partial mesh control data to other remote terminals over the partial mesh link. The partial mesh control data may be transmitted by either unicast or multicast transmissions.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A digital satellite communication system, comprising:
   a hub station comprising a satellite transceiver subsystem configured to transmit and receive digital communication data, the hub station configured to:
   define a Time Division Multiple Access (TDMA) channel for a return link communication from each of a plurality of user terminals;
   allot one or more time slots of an uplink portion for the return link to a first one of the plurality of user terminals for transmitting bursts of partial mesh link communications according to the TDMA protocol; and
   allot one or more time slots from a downlink portion of the return link to a second one of the plurality of user terminals to listen for bursts of partial mesh link communications; and
   the plurality of user terminals, each user terminal in communication with the hub station via the satellite, and each user terminal comprising:
   a forward link receiver configured to receive digital communication data transmitted from the hub station over a forward link;
   a partial mesh link receiver configured to receive burst transmissions transmitted from other user terminals over the partial mesh link; and a transmitter subsystem configured to burst transmit digital communication data to the hub station over the return link or to an other user terminal over the partial mesh link.

2. The digital satellite communication system of claim 1, wherein each of the user terminals is configured to transmit signal quality data related to the partial mesh link to the hub station over the return link.

3. The digital communication system of claim 2, wherein the hub station is configured to transmit partial mesh link control data over the forward link in response to the signal quality data received from one or more user terminals.

4. The digital communication system of claim 3, wherein the signal quality data comprises signal-to-noise (SNR) data.

5. The digital communication system of claim 3, wherein the control data comprises modulation type and code rates (MODCODEs).

6. The digital communication system of claim 3, wherein the hub station satellite transceiver subsystem and the user terminal forward link receiver and transmitter subsystem are configured to communicate according to a Digital Video Broadcast Return Channel via Satellite (DVB-RCS) standard, and wherein the control data is embedded in a correction message table.

7. The digital satellite communication system of claim 1, wherein the hub station satellite transceiver subsystem and the user terminal forward link receiver and transmitter subsystem are configured to communicate according to a Digital Video Broadcast Return Channel via Satellite (DVB-RCS) standard.

8. The digital satellite communication system of claim 7, wherein terminal burst time plan (TBTP) data is utilized for scheduling of communications over the partial mesh link.

9. The digital communication system of claim 1, wherein one of the user terminals is configured to generate and transmit partial mesh link control data to other user terminals over the partial mesh link.

10. A digital satellite communication terminal, comprising:
    a forward link receiver configured to:
        receive digital communication data transmitted from a hub station over a forward link; and
        receive a control message transmitted from the hub station setting a power level and frequency offset for the digital satellite communication terminal for partial mesh link transmissions, the control message based at least in part on a received power level and frequency offset reported to the hub station and measured by a second user terminal for a partial link transmission from the digital satellite communication terminal;
    a partial mesh link receiver configured to receive burst transmissions transmitted from other satellite communication terminals; and
    a transmitter subsystem configured to burst transmit digital communication data to the hub station over a return link or to another satellite communication terminal over a partial mesh link;
    wherein the return link comprises a Time Division Multiple Access (TDMA) channel defined by the hub station, and wherein communications over the partial mesh link are scheduled according to the TDMA protocol of the return link.

11. The digital satellite communication terminal of claim 10, wherein the transmitter subsystem is further configured to transmit signal quality data related to the partial mesh link to the hub station over the return link, the signal quality data comprising a measurement of a received power level and frequency offset for a received partial mesh link transmission.

12. The digital satellite communication terminal of claim 11, wherein the terminal is configured to receive partial mesh link control data over the forward link in response to signal quality data transmitted to the hub station.

13. The digital satellite communication terminal of claim 12, wherein the signal quality data comprises signal-to-noise (SNR) data.

14. The digital satellite communication terminal of claim 12, wherein the digital satellite communication terminal is configured to communicate according to a Digital Video Broadcast Return Channel via Satellite (DVB-RCS) standard, and wherein the control data is embedded in a correction message table.

15. The digital satellite communication terminal of claim 10, wherein the digital satellite communication terminal is configured to generate and transmit partial mesh link control data to other digital satellite communication terminal over the partial mesh link.

16. A method of communicating digital data via satellite between a hub station and a plurality of user terminals, comprising:
    establishing a forward link for transmitting digital communication data from the hub station to the plurality of user terminals; establishing a return link for transmitting digital communication data from the plurality of user terminals to the hub station; establishing a partial mesh link for transmitting digital communication data between the plurality of user terminals, wherein the establishing the partial mesh link comprises: allotting one or more time slots of an uplink portion for the return link to a first one of the plurality of user terminals for transmitting partial mesh link communications according to Time Division Multiple Access (TDMA) protocol; and allotting one or more time slots from a downlink portion of the return link to a second one of the plurality of user terminals to listen for bursts of partial mesh link communications from other terminals.

17. The method of claim 16, further comprising:
    transmitting partial mesh link quality data from one of the user terminals to the hub station over the return link; and
    transmitting control data in response to the partial mesh link quality data from the hub station to the remote user terminals over the forward link.

18. The method of claim 17, wherein the forward link and return link conform to a Digital Video Broadcast Return Channel via Satellite (DVB-RCS) standard, and wherein the control data is embedded in a correction message table.

19. The method of claim 16, further comprising transmitting partial mesh link control data over the partial mesh link from one user terminal to one or more other user terminals.

20. A system of communicating digital data via satellite between a hub station and a plurality of user terminals, comprising:
    means for establishing a forward link for transmitting digital communication data from the hub station to the plurality of user terminals; means for establishing a return link for transmitting digital communication data from the plurality of user terminals to the hub station; means for establishing a partial mesh link for transmitting digital communication data between the plurality of user terminals, wherein the means for establishing the partial mesh link comprises: means for allotting one or more time slots of an uplink portion for the return link to a first one of the plurality of user terminals for transmitting partial mesh link communications according to Time Division Multiple Access (TDMA) protocol; and means for allotting one or more time slots of a downlink portion of the return link to a second one of the plurality of user terminals to receive bursts of partial mesh link communications from other terminals; and means for transmitting a control message setting a modified power level and frequency offset for the first user terminal for partial mesh link transmissions the control message based at least in part on a power level and frequency offset measurement reported by the second user terminal for the partial mesh link transmission transmitted by the first user terminal to the second user terminal via the allotted time slots of the uplink portion and the downlink portion.

* * * * *